July 26, 1932.   C. N. LIEB   1,868,836
VEHICLE BRAKE
Filed April 5, 1930   3 Sheets-Sheet 2
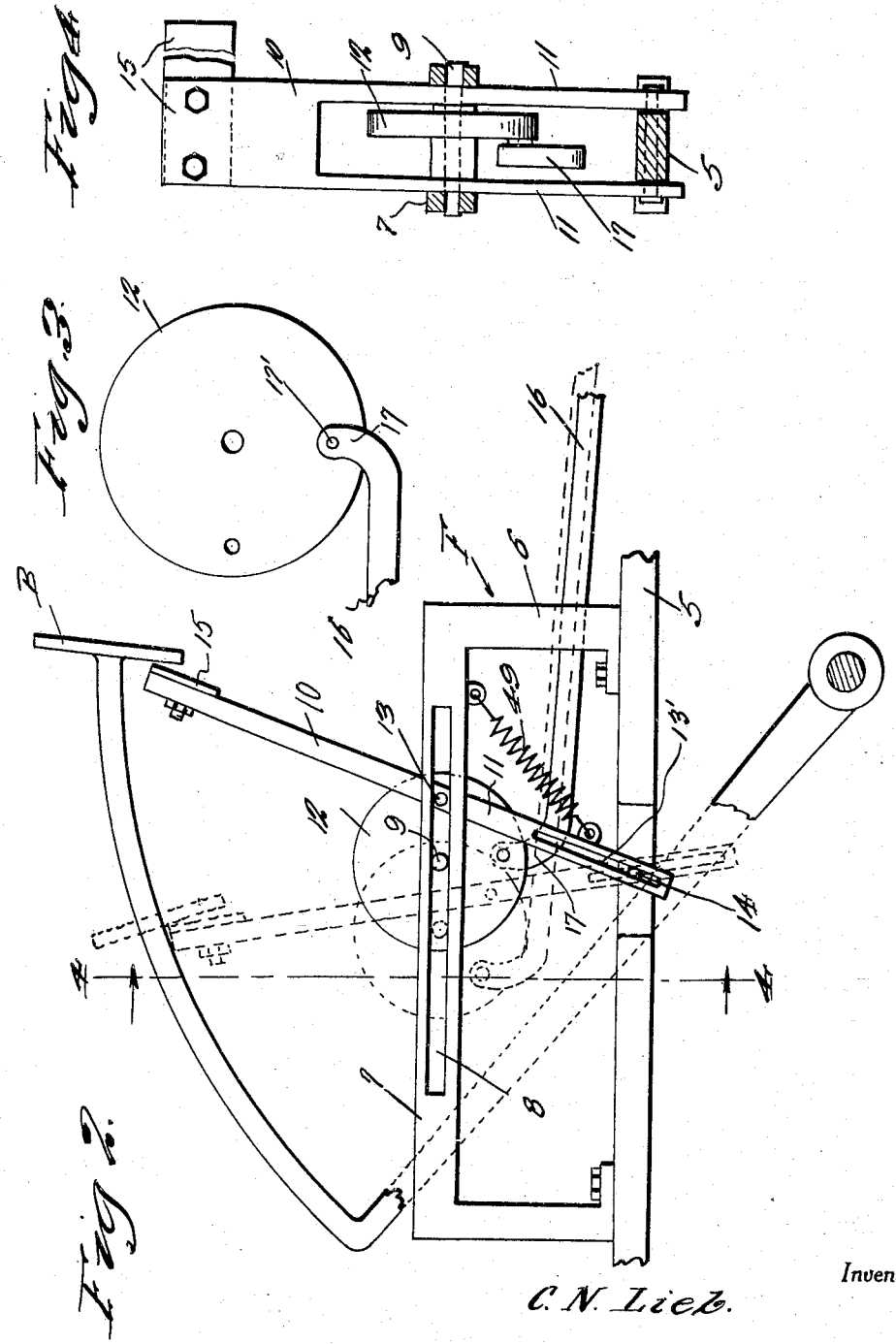
Inventor
C. N. Lieb.
By Clarence A. O'Brien
Attorney

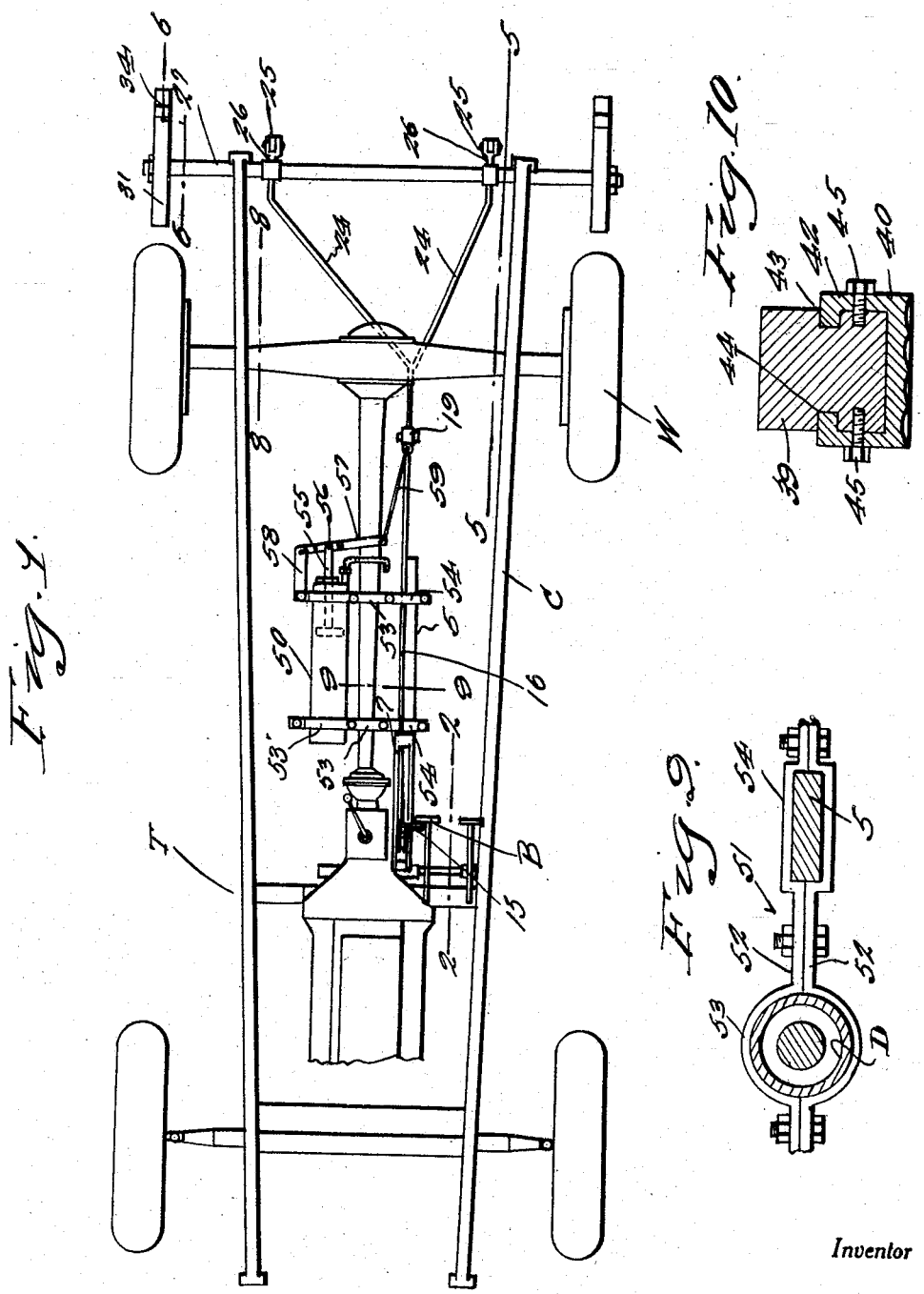

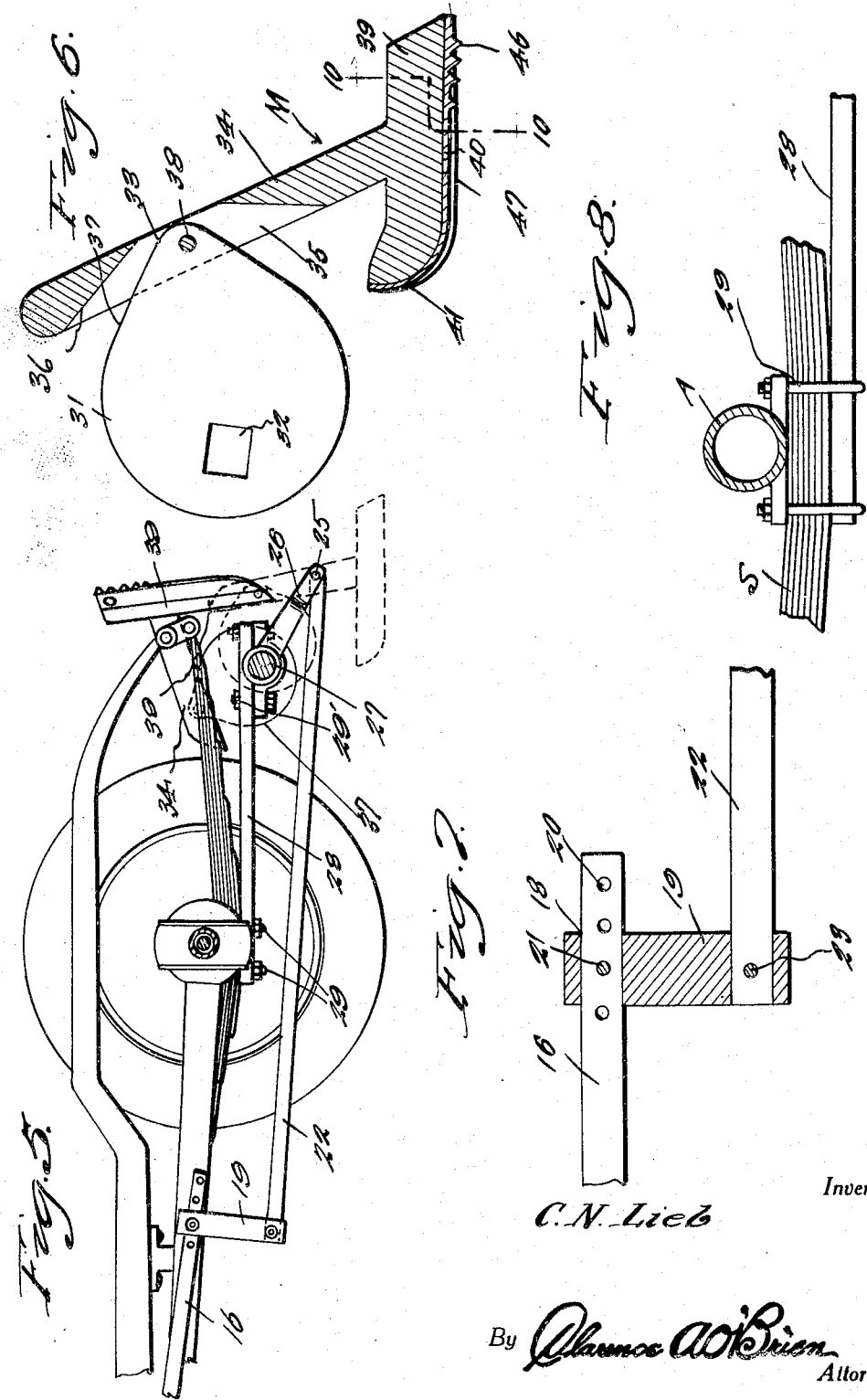

Patented July 26, 1932

1,868,836

UNITED STATES PATENT OFFICE

CHRISTIAN N. LIEB, OF FINDLAY, OHIO

VEHICLE BRAKE

Application filed April 5, 1930. Serial No. 442,002.

This invention relates to certain new and novel improvements in vehicle brakes, and the primary object of the invention is to provide a novel type of brake adapted to engage with the ground for applying a braking action to the vehicle.

A still further object of the invention is to provide a ground engaging brake for vehicles which may be readily and easily applied to the conventional type of vehicle, especially automobiles and of such an arrangement and construction as to avoid skidding of the vehicle, and which is economical, strong, practical, durable, efficient in operation, and otherwise well adapted for the purpose designed.

Other objects and advantages of the invention will become apparent during a study of the following description, taken in connection with the accompanying drawings wherein:

Figure 1 is a top plan view of an automobile chassis showing the application of my invention thereto, Figure 2 is a detail sectional view taken on the line 2—2 of Figure 1, Figure 3 is a side elevational view of a control disk forming a part of the invention, Figure 4 is a detail sectional view taken substantially on the line 4—4 of Figure 2, Figure 5 is a detail sectional view taken substantially on the line 5—5 of Figure 1, Figure 6 is a detail sectional view taken substantially on the line 6—6 of Figure 1, Figure 7 is a fragmentary detail view partly in section and partly in elevation for illustrating the manner of adjustably connecting the brake rods to the control rods.

Figure 8 is a detail sectional view taken on the line 8—8 of Figure 1,

Figure 9 is a similar view taken on the line 9—9 of Figure 1,

Figure 10 is a fragmentary detail sectional view taken on the line 10—10 of Figure 6.

It will be seen, with reference more in detail to the drawings, that I have designated an automobile chassis frame generally by the reference character C. The foot brake of the automobile is designated by the reference character B. A horizontally disposed supporting beam or bar 5 is mounted between the chassis bars of the automobile chassis frame through any suitable means and supported on said beam 5 at one end thereof adjacent the brake pedal is an inverted U-shaped frame F comprising vertically disposed end legs 6 connected by a pair of spaced parallel horizontal frame bars 7 each of which bars 7 is provided with an elongated longitudinal slot 8.

A shaft 9 is supported between the frame bars 7 the ends of the shaft being operable in the slots 8. The shaft 9 is adapted for sliding movement longitudinally of the slots 8. A forked lever 10 comprises a pair of spaced parallel coextensive legs 11—11 pivoted intermediate their ends to a disk 12 eccentrically of the disk as at 13.

The disk 12 is mounted on the shaft 9 between the frame bars 7. The legs 11 straddle the disk 12 and each of the legs 11 at their lower ends is provided with a longitudinal elongated slot 13' for accommodating one end of a pin 14 suitably carried by the bar 5 to provide a pin and slot connection between the bar 5 and said legs 11—11.

The upper end of the fork 10 has bolted or otherwise secured thereto an abutment plate 15 one end of which extends laterally of the fork 10 to be engaged by the brake pedal B in a manner and for a purpose to be hereinafter more fully set forth.

An elongated brake rod 16 at one end terminates in an upwardly curved terminal 17 pivoted to the disk adjacent a peripheral edge of the disk as at 17'. The brake rod 16 extends downwardly and rearwardly toward the rear of the chassis frame and at its free end is adapted to be received in an opening 18 formed in one end of a coupling member 19. At said free end the brake rod 16 is provided with a series of openings 20 whereby said end may be adjustably secured within the opening 18 through the medium of a pin 21.

The coupling member 19 at its opposite or lower end is provided with an opening to receive one end of a shank member 22, said one end of the shank member 22 being rigidly secured to the coupling as at 23. The shank 22 at its opposite end merges into a pair of diverging brake operating arms 24. These arms 24 are of unequal length, and at their free ends are pivotally connected as at 25 to rocker arms 26 carried by a rock shaft 27 extending transversely of the chassis frame rearwardly of the rear wheels W of the vehicle.

For rotatably supporting the rock shaft 27 I provide a pair of elongated bracket plates 28 one beneath each of the chassis bars C parallel to the chassis bars. The bracket bars 28 are secured by suitable U-bolt clamps 29 to the springs S of the vehicle directly beneath the rear axle A of the vehicle.

As before intimated these bracket bars 28 extend rearwardly and at their free ends are provided with suitable bearing clamps 29' for rotatably supporting the rock shaft 27.

The rock shaft 27 at its opposite ends terminates somewhat in alinement with the rear wheels W. The ends of the rock shaft 27 are squared, and secured to said ends of the rock shaft are cam like plates 31, each of which plates 31 is provided with a squared opening 32 for receiving the squared end of the rock shaft whereby the plates will be rocked upon rocking of said shaft.

Each of the cam like plates 31 merge into a reduced end 33. With each of the cam plates 31 is associated a brake member designated generally by the reference character M.

Each of the brake members M comprises an oblique shank 34 provided with a longitudinal slot 35, the end walls of which slot converge inwardly toward the bottom of the slot so as to provide cooperating surfaces 36 complemental to the surfaces 37 of the cam plate 31. The tapered end 33 of the cam plate is pivoted within the slot 35 as at 38 intermediate the ends of said slot.

At its lower end the shank 34 terminates in a brake shoe 39. The brake shoe 39 is provided with a tread member or plate 40, which plate 40 at its forward end terminates in an upwardly curved end extension 41 conforming to the upwardly curved end portion of the shoe 39. The tread plate 40 is somewhat of box like configuration in cross section including side walls or flanges 42 terminating in inwardly directed shoulders 43 receivable in grooves 44 on opposite sides of the shoe 39.

The tread member 40 is further secured to the shoe through the medium of bolts 45 engaging the flanges 42 and the shoe 40 as clearly shown in Figure 10.

Furthermore the tread member 40 on the bottom thereof adjacent the rear end is provided with a plurality of transverse ground engaging teeth 46 together with longitudinally extending spaced ground engaging teeth 47 extending inwardly from said innermost one of the teeth 46 and continuing forwardly of the tread member to the curved end 41 of the tread member as clearly suggested in Figure 6.

For normally retaining the brake member M in that position shown in full lines in Figure 5, and the fork member 10 in that position shown in Figure 2 in full lines, there is provided a coil spring 49 anchored at one end to the frame F and at its other end to the member 10 adjacent the lower end of the legs 11 of said member 10.

From the foregoing it will be seen to apply the brakes, that is to move the brake members M into ground engaging position, the operator of the vehicle presses inwardly on the brake pedal B in the usual manner, said pedal engaging the extended end of the abutment plate 15, and as the pedal B moves inwardly it will be apparent that the member 10 is moved in a similar direction and at the same time moves downwardly for rotating the disk 12, and at the same time moving the disk to the left in Figure 2 whereupon the parts attain that position shown in dotted lines in Figure 2.

With this action of the disk, a forward pull is exerted on the brake bar 16 exerting a like pull on the brake arm 24 thus rocking the rock shaft 27 for swinging the cam plate 31 to the dotted line position in Figure 5, whereupon the shank 34 of the brake member will be moved to that position shown in dotted lines in Figure 5 with the tread plate of the brake shoe engaging the ground thus bringing the vehicle to a stop.

Manifestly upon release of the brake pedal, the parts are returned to their normal position under the action of the spring 49.

If desired, the brakes may be operated through the medium of fluid pressure means and to this end there is provided a fluid cylinder 50. Brackets 51 comprise complemental members 52—52, which members at one end are provided with arcuate or semi-circular clamping jaws 53' for engaging the cylinder 50 therebetween while at their opposite ends the members 52 are provided with substantially U-shaped jaws 54 for clamping therebetween the supporting beam 5. Between jaws 53' and jaws 54, the clamping members are provided with jaws 53, similar to jaws 53'. Jaws 53 clamp therebetween the drive shaft housing D. (See Fig. 9.)

The rod 55 operable within the cylinder 50 has a pivotal connection 56 with a rod 57 pivoted at one end to an arm 58, which arm in turn at its opposite end is pivoted between the members of one of the clamps 51. The member 57 at its opposite end is operatively connected to the coupling 19 through the medium of a link 59.

Fluid to the cylinder may be supplied from any suitable source, controlled by the foot brake pedal B so that obviously when the pedal is moved inwardly for applying the brake, fluid may be forced to the cylinder 50 thus operating the piston within the cylinder for rocking the member 57 which in turn will exert a pull on the arms 24—24 in the desired direction for rocking the rock shaft 27 to move the brake members M into a ground engaging position, for bringing the vehicle to a stop.

It is to be noted, and as is apparent from a study of the drawings, that the members M are arranged directly rearwardly of the rear wheels of the vehicle and will be moved into engagement with the ground substantially in the tracks of said rear vehicle wheel.

It is thought from the foregoing description, taken in connection with the accompanying drawings, a clear understanding of the operation, construction, utility and advantages of an invention of this character may be had by those skilled in the art, without a more detailed description.

Having thus described my invention, what I claim as new is:

1. In a brake for vehicles, a rock shaft, means for rotatably supporting said shaft transversely of the vehicle, a plate member secured to said shaft for rotative movement with the shaft, a ground engaging brake shoe pivotally and eccentrically mounted on the said plate, and means for rocking said shaft for moving said shoe into and out of ground engaging position, said brake shoe being arranged directly rearwardly of a rear wheel of the vehicle for engagement with the ground in the tracks of said rear wheel, said last mentioned means including a rocker arm carried by said shaft, a member pivoted at one end to said rocker arm, and means operatively connecting said member with the brake pedal of the automobile for controlling movement of said rock shaft from said brake pedal.

2. In a brake for vehicles, a disk, means for slidably and rotatably supporting said disk, a rock shaft, means for mounting said rock shaft on the vehicle, a ground engaging brake shoe carried by said rock shaft for movement therewith, said brake shoe being arranged rearwardly of a wheel of the vehicle and adapted for ground engaging position in the track of said vehicle wheel, eccentric means operatively connecting said rock shaft with said disk, and a manually operable operating member eccentrically engaged with said disk, for simultaneously rotating and sliding said disk in one direction for rocking said rock shaft.

3. In a brake for vehicles, a disk, means for slidably and rotatably supporting said disk, a rock shaft, means for mounting said rock shaft on the vehicle, a ground engaging brake shoe carried by said rock shaft for movement therewith, said brake shoe being arranged rearwardly of a wheel of the vehicle and adapted for ground engaging position in the track of said vehicle wheel, means operatively connecting said rock shaft with said disk, and means for simultaneously rotating and sliding said disk in one direction for rocking said rock shaft, said last mentioned means including a member carried by said disk, said member having one end thereof disposed in operative relation to the brake pedal of the vehicle whereby when the brake pedal is moved to a brake applying position, said disk is simultaneously rotated and slidably actuated for moving said brake shoe into ground engaging position.

4. In a brake for vehicles, a disk, means for slidably and rotatably supporting said disk, a rock shaft, means for mounting said rock shaft on the vehicle, a ground engaging brake shoe carried by said rock shaft for movement therewith, said brake shoe being arranged rearwardly of a wheel of the vehicle and adapted for ground engaging position in the track of said vehicle wheel, means operatively connecting said rock shaft with said disk, and means for simultaneously rotating and sliding said disk in one direction for rocking said rock shaft, said last mentioned means including a member carried by said disk, said member having one end thereof disposed in operative relation to the brake pedal of the vehicle whereby when the brake pedal is moved to a brake applying position, said disk is simultaneously rotated and slidably actuated for moving said brake shoe into ground engaging position, and spring means engageable with said member for moving said member and said disk to their initial position when the brake pedal is moved to a brake releasing position.

5. In a brake for vehicles, a frame, means for mounting said frame on the vehicle, a shaft mounted on said frame for movement longitudinally of the frame, a disk mounted on said shaft, a member pivoted intermediate its ends to said disk eccentrically of said disk, guide means for slidably and rockably controlling said member, whereby when said member is actuated, said disk will be rotated in one direction and said shaft will be moved longitudinally of the frame, spring means engageable with said frame and said member, a rock shaft, means for mounting said rock shaft on the vehicle, a ground engaging brake member carried by said rock shaft for movement therewith, and means operatively connecting said disk with said rock shaft.

6. In a brake for vehicles, a rock shaft, means for mounting said rock shaft transversely of the vehicle rearwardly of the vehicle, plates carried by said shaft for movement therewith, ground engaging elements respectively provided with a shank, eccentric pins carried by said plates and engaging said shanks, means for actuating said rock shaft, and each of said ground engaging elements including a tread member, on one end of its shank.

7. In a brake for vehicles, a rock shaft, means for mounting said rock shaft transversely of the vehicle, plates carried by said shaft for movement therewith, ground engaging elements respectively including a shank pivotally engaging one of the plates eccentrically of the plate, together with a tread member on one end of said shank, said tread member being provided with longitudinal and transverse surfacing engaging teeth, and means for rocking said shaft.

In testimony whereof I affix my signature.

CHRISTIAN N. LIEB.